July 12, 1966  S. F. LEASKO  3,260,809

MOISTURE-SHORTABLE FUSE FOR A MOTOR CIRCUIT

Filed July 17, 1964

INVENTOR.
STEVEN F. LEASKO
BY C. G. Stratton
ATTORNEY

United States Patent Office 3,260,809
Patented July 12, 1966

3,260,809
MOISTURE-SHORTABLE FUSE FOR A
MOTOR CIRCUIT
Steven F. Leasko, Torrance, Calif. (% Les-Ko Industries, 1146 S. Inglewood Ave., Inglewood, Calif.)
Filed July 17, 1964, Ser. No. 383,456
5 Claims. (Cl. 200—61.04)

This invention relates to a fuse that becomes electrically shorted when wetted to interrupt an electric circuit, thereby guarding the motor in said circuit as well as the safety of the user thereof.

In general utility vacuum-type machines which function to pick up water from sinks, drains, floors or other places where the same may collect, a water cut-off valve in the system may fail to operate and cause an excess amount of such water to reach the electric motor that drives the vacuum fan that circulates such water. A short in the motor may result not only in running the same, but also in subjecting the user of the machine to massive and harmful electric shock.

An object of the present invention is to provide a fuse device in such a motor circuit that will become shorted, thereby interrupting the current flow through the motor before excess water may reach the same to deleteriously affect it.

Another object of the invention is to provide a fuse device, as above characterized, that is located at the inlet of the water-circulating fan so as to become moistened due to back-up in the fan for any reason, thereby breaking the circuit of the motor that drives the fan before the water floods the motor to cause it to short.

A further object of the invention is to provide a moisture-shorted fuse that, as a unit, is mounted for ready application to and removal from its position at the inlet of the fan that is driven by a motor which is protected by the fuse.

This invention also has for its objects to provide such means that are positive in operation, convenient in use, easily installed in a working position and easily disconnected therefrom, economical of manufacture, relatively simple, and of general superiority and serviceability.

The above objects are realized in a fuse device of ring form, covered by a moisture-absorbing pad, provided with a channel in which conductors of the electric circuit to a motor are disposed in spaced relation, and in which soluble crystals having electrically conductive properties, when wetted and dissolved by moisture from said pad, short said conductors by arcing across them and opening the motor circuit. The present fuse device comprises a unit that is separably mountable at the inlet to the fan for ready removal and replacement when blown.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

Figure 1:
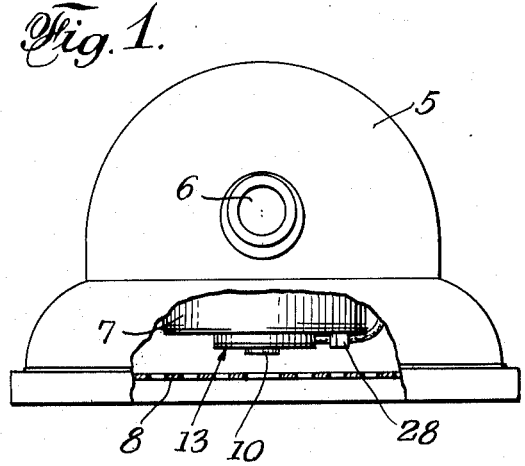
FIG. 1 is a partly broken side elevational view of a vacuum-type utility machine that circulates water, the same being shown with the present fuse device in operative position thereon.

The machine illustrated in FIG. 1 has an outer housing 5 provided with an outlet 6 which may be connected to a place of disposal of water drawn by a vacuum fan 7 through a foraminous plate 8. Said fan, illustrated only by its outer shell, has a rotor 9 provided with an extension 10 to which various implements may be connected. An electric motor 11 (shown in FIG. 5) is contained in the housing 5 and drives the fan 7 when the switch 12 in the motor circuit is closed. The present fuse device 13 is connected in the motor circuit so as to provide a series circuit through the motor 11 and switch 12 to the current-supplying line.

The present fuse device 13 comprises, generally, a ring 15 of dielectric material, preferably concentric and closely spaced fusible wire means 16 in the circuit of said motor 11 and housed below the outer surface of said ring 15, means 17 which, when wet, becomes a conductor and creates an electric short across said wire means 16 to interrupt current flow therethrough, means 18 to conduct water or other moisture to the means 17 to wet the latter, and means 19 to separably connect the fuse device in a position around the inlet flow of water to the inlet 20 of the fan 7.

Any suitable and rigid plastic or rubber composition may be used in the production of the ring 15 which is provided with an open annular groove 21 in one face thereof. Plural pairs of posts or studs 22 extend from the floor of the groove to constitute means around which the wire means 16 is trained. Said studs are merely exemplary of means to properly locate the wire means.

The latter is shown as two generally parallel wires 23 and 24 that are disposed in the groove 21 with the studs or posts 22 retaining their spaced position in the groove.

Figure 5:
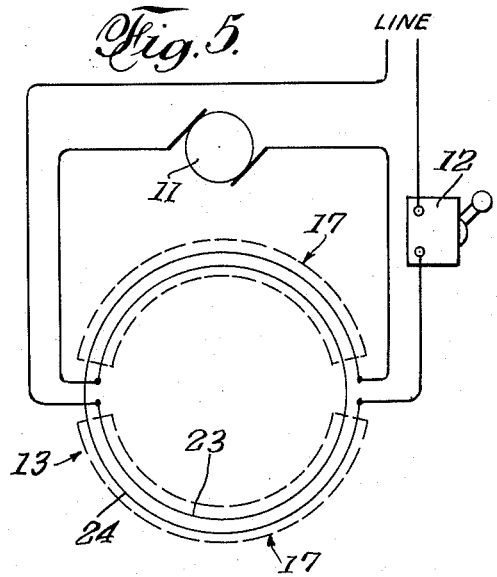
FIG. 5 is an electrical diagram showing the present fuse device in the electric circuit of the motor of the machine illustrated in FIG. 1.
Figure 2:
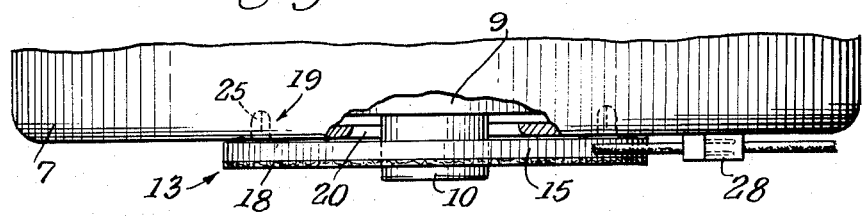
FIG. 2 is an enlarged side view, partly in section, of the shell of the fan of the machine in FIG. 1, with the fuse device mounted thereon across the path of flow of water into said shell.
Figure 3:
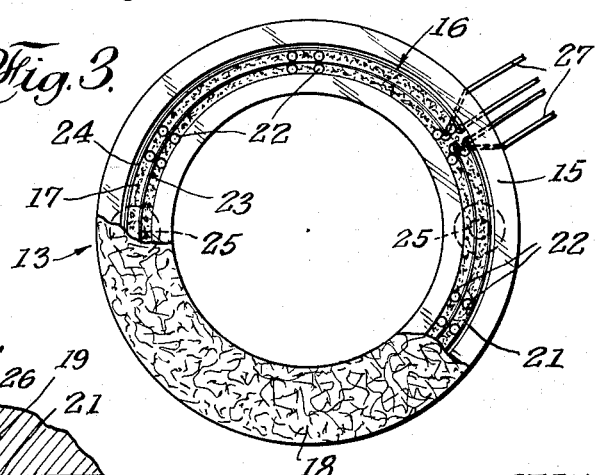
FIG. 3 is a bottom plan view of said fuse device with the water-absorbing means thereof partly broken away.
Figure 4:
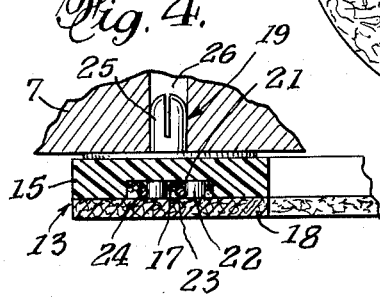
FIG. 4 is a still larger and fragmentary detail view of features of construction of the present fuse device.

The means 17 preferably comprises a layer of glue, adhesive or cement sprinkled with a quantity of crystals of which common table salt is a primary example. The means 17 is ordinarily dry and the salt is in separate crystalline form. The wires 23 and 24 are positioned upon said dry means 17 and each of them will carry the current of the circuit through the motor 11, as shown in FIG. 5, said wires 23 and 24 being in series with the motor 11, as illustrated in said figure.

The means 18 is shown as an absorbant ring of material applied to the ring 15 and covering the groove 21 and the means 16 and 17. This ring is cemented by its edges to the ring 15 and, being in position around the fan inlet 20, will become wetted by any abnormal or backed-up flow to the fan and which may be caused by any of the reasons hereinabove enumerated.

The wetted ring 18 conducts water to the crystals of salt or other material which, when dissolved in water, provides the water with conductivity that is not a property of pure water. The two wire conductors 23 and 24 are, therefore, bridged by a fluid conductor that causes arcing thereacross to create an electrical short that breaks one or both of said wires and interrupts the current flow to the motor 11.

The means 19 is shown as a pair of studs or jacks 25 that are separably engaged in seats 26 in a wall of the fan 7. Said jacks are so located as to hold the device 13 in the described operative position until replacement thereof is desired.

The fuse device has four leads 27 extending therefrom. The same may be separably connected as by a pin jack connector 28 in the motor circuit, to place the wires 23 and 24 in said circuit, as illustrated in FIG. 5.

While table salt (sodium chloride) is preferred as the shorting agent because of its low cost, other crystalline salts, as potassium chloride or sulfate, or magnesium sulfate, may be used.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A moisture-shorted fuse comprising:
   (a) a dielectric member having a groove in one face thereof,
   (b) two fusible wires disposed in said groove, the same being conductors in an electric circuit,
   (c) a water-soluble mass of material in said groove and in contact with said two wires, and
   (d) porous means receptive of moisture and to conduct the same to said material to dissolve portions thereof and render the same electrically conductive, thereby causing shorting across said wires to interrupt the current in the circuit.

2. A moisture-shorted fuse according to claim 1 in which said mass of material comprises a quantity of salt crystals embedded in adhesive.

3. A moisture-shorted fuse according to claim 1 provided with means to separably mount the same in operative position.

4. In combination:
   (a) a machine having a vacuum fan to provide a flow of water through its inlet, and having an electric motor to operate the same, with an electric circuit for energizing said motor, and
   (b) a fuse device separably mounted around said flow to the fan inlet and including two wire conductors as components in series in the motor circuit,
   (c) said device including a normally dry mass of material in which the two wires are embedded and embodying salts that impart conductivity to water moistening the same and flowing around the wire conductors to arc thereacross to fuse and break the conductors and interrupt the circuit.

5. The combination of claim 4 provided with a water-absorbing member to conduct water to said conductors.

References Cited by the Examiner

UNITED STATES PATENTS 1,648,197   11/1927   Roodhouse _____ 340—235

BERNARD A. GILHEANY, *Primary Examiner.*

ROBERT K. SCHAEFER, *Examiner.*

R. N. ENVALL, JR., *Assistant Examiner.*